(No Model.)
A. JAMES.
Storing Compressed Air or other Gas in Vessels.
No. 240,423. Patented April 19, 1881.
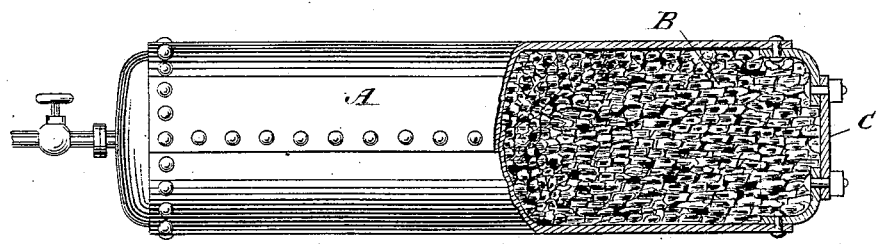
WITNESSES:
L. Allen
Chas. M. Higgins.
INVENTOR:
Alexander James M.D.
by S. W. Wales
Atty.

UNITED STATES PATENT OFFICE.

ALEXANDER JAMES, OF EDINBURGH, SCOTLAND.

STORING COMPRESSED AIR OR OTHER GAS IN VESSELS.

SPECIFICATION forming part of Letters Patent No. 240,423, dated April 19, 1881.

Application filed May 27, 1880. (No model.)

*To all whom it may concern:*

Be it known that I, ALEXANDER JAMES, M. D., of the city and county of Edinburgh, Scotland, have invented certain new and useful Improvements for Storing Compressed Air or other Gas in Vessels, of which the following is a full, clear, and exact description, reference being had to the accompanying drawing, forming part of this specification.

This invention relates more particularly to a method and means for storing compressed air for motive power for locomotives or cars for railroads; but it may also be applied to the storage of compressed air or other gas for such purposes as sewing-machine motors, or portable illuminating-gas apparatus on railroad-trains, and for any and all purposes wherein compressed air or gas is required to be stored.

The invention partly consists in a method of compressing air wherein the adhesive attraction of an absorbent material or materials is made to assist dynamic power and static pressure in reducing the volumes of gaseous bodies in confined spaces or inclosures.

The invention further consists in an apparatus for storing compressed air or other gases, by which the force of adhesion existing between gases and absorbent substances is made to act, in conjunction with mechanical pressure, to condense a larger quantity of gas in a given cubic space than could be otherwise stored therein, said apparatus consisting substantially of a reservoir or receiver for the compressed gas and a porous substance or substances possessing absorptive power confined in said reservoir or receiver. Charcoal made from box-wood or cocoanut-shells, especially the latter, possesses this power of absorption to a very high degree, and sponge-platinum to a still higher degree, and the absorptive power of charcoal treated with a solution of platinum is greatly increased.

In the particular case of compressed-air locomotives there has been considerable difficulty experienced in storing a large supply of compressed air without adding too much to the weight. By the use of this invention this difficulty will be, to a great extent, obviated, and this very desirable means of locomotion made more practicable than hitherto.

The drawing is a side view, partially sectional, of a tank or reservoir for compressed air, in which my method of storing compressed air or gases is carried out.

A is the wall of the tank or reservoir, constructed of boiler-iron or steel, or other suitable material. B is the absorbent material. An opening in the end of the reservoir is supplied with a suitable cover or lid, C, by which the tank can be hermetically sealed when it has received its charge of material.

A material that absorbs a volume of air or gas at atmospheric pressure will absorb nearly or quite the same volume at higher pressures. It logically follows that a material capable of absorbing more than its own volume of a gas will, by its inherent condensing power, increase the volume of air or gas which can be introduced into a confined space in which such material is placed. This principle is the basis of my method of storing air or gas, which consists in compressing the air or gas by dynamic power into a tank or reservoir containing a material capable of absorbing more than its own volume of the air or gas till a stated pressure of the unabsorbed air in the tank is attained, and then hermetically sealing the reservoir or tank. When the pressure in the tank is reduced by consumption of the air or gas therefrom, the absorbent material yields up so much of the air or gas condensed therein as will reduce the amount still retained by it to the volume, under the reduced pressure, which such absorbent material or substance normally condenses into its pores.

Having thus fully described my invention, what I claim, and desire to secure by Letters Patent, is as follows:

1. The method of storing air or gas herein described, which consists in first compressing the air or gas into a receptacle containing a material or substance capable of condensing into its pores more than its own volume of the air or gas under pressure, and then hermetically sealing the receptacle, whereby more air or other gas can be condensed in said receptacle and taken therefrom under lower pressure than could be done without the presence of said material in said receptacle, substantially as specified.

2. In an apparatus for carrying out the herein-described process of storing compressed air and other gases, a reservoir or vessel intended for the storage of air or other gas under pressure, and a porous substance or substances possessing high absorptive properties confined in said reservoir or vessel, substantially as and for the purposes described.

ALEXANDER JAMES, M. D.

Witnesses:
 DAVID MAIR,
 THOMAS DICK,
  *Writers, both of Leith.*